(12) United States Patent
Flores Guerra

(10) Patent No.: US 10,887,189 B2
(45) Date of Patent: Jan. 5, 2021

(54) SYSTEMS AND METHODS OF MAPPING CONNECTED DEVICES

(71) Applicant: Dish Network L.L.C, Englewood, CO (US)

(72) Inventor: Jesus Flores Guerra, Greenwood Village, CO (US)

(73) Assignee: DISH Network L.L.C., Englewood, CO (US)

( * ) Notice: Subject to any disclaimer, the term of this patent is extended or adjusted under 35 U.S.C. 154(b) by 3 days.

(21) Appl. No.: 15/668,023

(22) Filed: Aug. 3, 2017

(65) Prior Publication Data

US 2019/0044826 A1  Feb. 7, 2019

(51) Int. Cl.
| | |
|---|---|
| *H04L 12/24* | (2006.01) |
| *H04W 4/08* | (2009.01) |
| *H04W 4/02* | (2018.01) |
| *H04W 4/70* | (2018.01) |
| *H04W 4/80* | (2018.01) |

(52) U.S. Cl.
CPC ............ *H04L 41/22* (2013.01); *H04L 41/082* (2013.01); *H04L 41/0806* (2013.01); *H04L 41/12* (2013.01); *H04W 4/02* (2013.01); *H04W 4/08* (2013.01); *H04L 41/0893* (2013.01); *H04W 4/70* (2018.02); *H04W 4/80* (2018.02)

(58) Field of Classification Search
CPC .............. G01C 21/206; G06F 3/04847; G06F 17/5004; H04L 12/282; H04L 12/2803; H04L 41/22; H04L 41/12; H04L 41/0806; H04L 41/082; H04L 41/0983; H04W 4/043; H04W 4/08; H04W 4/02; H04W 4/70; H04W 4/80
See application file for complete search history.

(56) References Cited

U.S. PATENT DOCUMENTS

| | | | |
|---|---|---|---|
| 9,307,368 B1 * | 4/2016 | Bartlett | .................... H04W 4/04 |
| 2011/0071656 A1 * | 3/2011 | McKiel, Jr. | .............. G06N 5/02 |
| | | | 700/90 |
| 2012/0130513 A1 * | 5/2012 | Hao | ....................... G05B 15/02 |
| | | | 700/90 |
| 2013/0047120 A1 * | 2/2013 | Albright | .............. G01C 21/206 |
| | | | 715/810 |
| 2013/0191755 A1 * | 7/2013 | Balog | ................. H04L 41/0806 |
| | | | 715/735 |

(Continued)

FOREIGN PATENT DOCUMENTS

WO    WO-2014113882 A1 *  7/2014  ............. H04W 4/02

Primary Examiner — Andrew L Tank
(74) Attorney, Agent, or Firm — Pekins Coie LLP

(57) ABSTRACT

Embodiments described herein are directed at mapping and controlling network-enabled IoT devices housed in an environment via a graphical user interface (GUI) of an electronic device. The disclosed features include generating a digital map representing the 3D or the 2D position of the IoT devices in the environment. In some embodiments, the digital map can be overlaid on a layout of a physical floorplan of the environment also showing physical objects in the environment. Different IoT devices in the environment can be controlled via a GUI common to the different IoT devices. Additionally, the GUI can be used to select a group of IoT devices and perform group-wise control of the IoT devices in the group.

20 Claims, 5 Drawing Sheets

(56) References Cited

U.S. PATENT DOCUMENTS

| | | | |
|---|---|---|---|
| 2013/0226451 A1* | 8/2013 | O'Neill | G01C 21/206 701/450 |
| 2014/0068486 A1* | 3/2014 | Sellers | G06F 3/04847 715/771 |
| 2014/0141803 A1* | 5/2014 | Marti | H04W 4/043 455/456.2 |
| 2014/0278281 A1* | 9/2014 | Vaynriber | G06F 17/5004 703/1 |
| 2016/0021040 A1* | 1/2016 | Frei | H04L 29/1249 709/206 |
| 2016/0140257 A1* | 5/2016 | Vega | G06F 17/5004 703/1 |
| 2016/0374133 A1* | 12/2016 | Logue | H04W 8/005 |
| 2018/0069932 A1* | 3/2018 | Tiwari | G01S 5/0252 |

* cited by examiner

SYSTEMS AND METHODS OF MAPPING CONNECTED DEVICES

BACKGROUND

The Internet of Things (IoT) is set to disrupt the way we live and work. Future "smart homes" are going to be equipped with devices that are connected with each other to make our lives easier, more convenient, and more comfortable. For example, connected devices will be able to handle operations such as lighting, temperature, etc. that would free up residents' time for performing other tasks. Smart home energy equipment devices can help reduce costs and conserve energy. Typical IoT implementations in the home include a wide variety of devices and related accessories. Non-limiting examples of IoT devices can include smart appliances (washers, dryers, refrigerators, televisions, set-top boxes, dvd players, home theaters, etc.), smart home safety and security systems (sensors, monitors, cameras, alarm systems, automatic sprinklers, etc.), and smart home energy equipment (thermostats and smart lighting. Thus, not only can there be a large number of devices and accessories, but additionally they can be of different types, serve different purposes, and from different manufacturers. Consequently, keeping track of such a wide variety of devices and accessories can prove to be significantly challenging.

SUMMARY

Embodiments described herein are directed at systems, methods, and apparatus for mapping and controlling network-enabled IoT devices housed in an environment via a graphical user interface (GUI) configured to run on an electronic device. Examples of an electronic device can include a set top box, a phone, a tablet computer, a router, a gateway, or an IoT controller/base station. The method includes receiving information including spatial locations of one or more IoT devices deployed in an environment; associating each IoT device in the one or more IoT devices with a respective position in the environment based on the spatial information; generating a graphical user interface (GUI) for displaying a digital map that includes a respective position of each IoT device in the environment; and upon receiving a request from a user of the electronic device, overlaying the digital map on a physical floorplan of the environment, wherein the physical floorplan includes one or more indicia representing one or more physical objects included in the environment. In some embodiments, the disclosed method can be implemented on a mobile application configured to run on an electronic device. For example, the mobile application can be an IPHONE™ app, a WINDOWS™ app, a BLACKBERRY™ app, or an ANDROID™ app and configured to run on a phone, a tablet computer, a desktop computer, or a wearable consumer device.

It is to be understood that both the foregoing summary and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The same number represents the same element or same type of element in all drawings.

DETAILED DESCRIPTION OF THE DRAWINGS

Figure 1A:
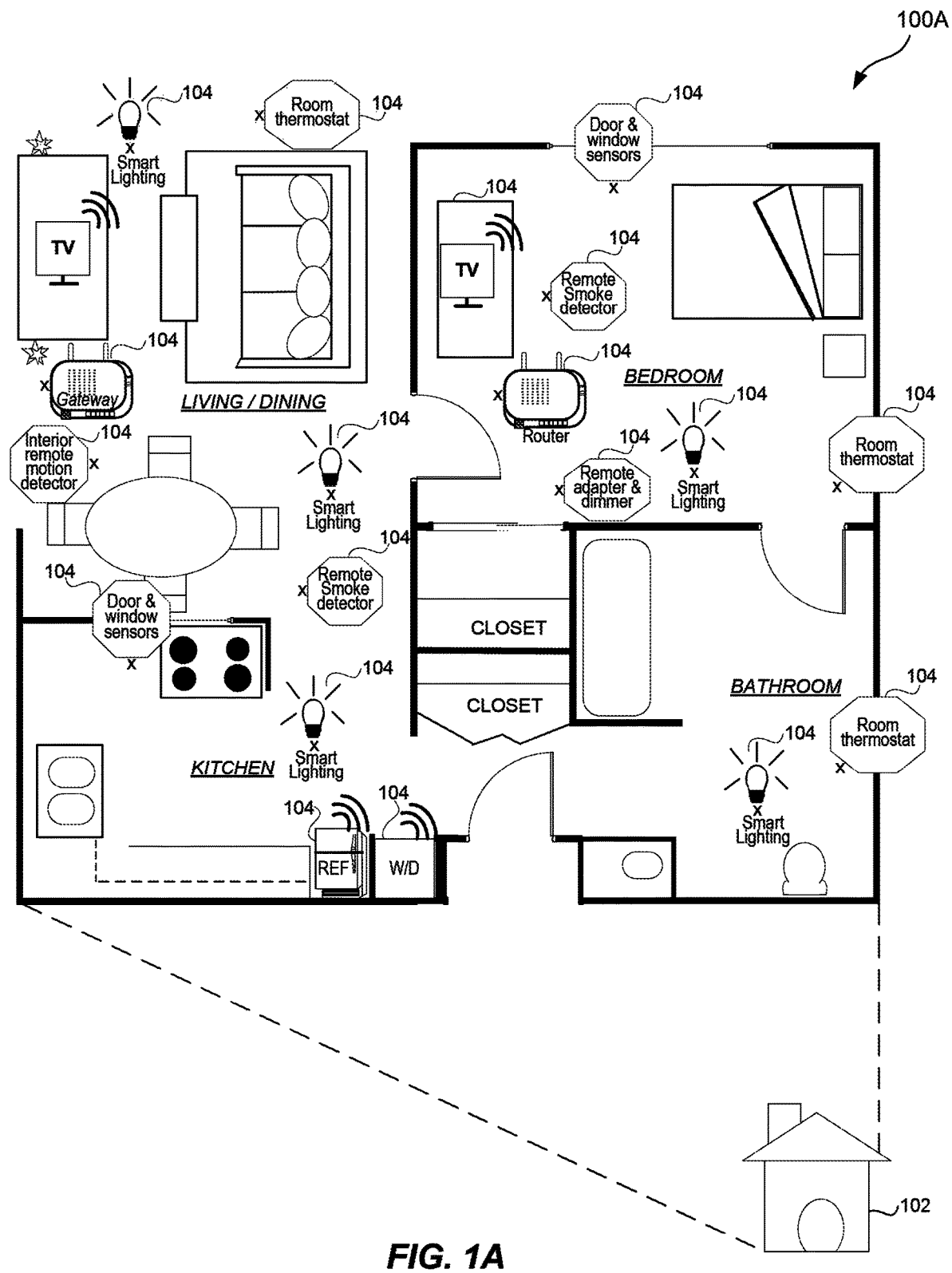
FIG. 1A illustrates an example floor plan of a home depicting IoT devices installed in different locations in the home environment, according to some disclosed embodiments.

The various embodiments described herein generally provide apparatus, systems and methods which facilitate the mapping and controlling of network-enabled IoT devices housed in an environment via a graphical user interface (GUI) of an electronic device. More particularly, the method (e.g., implemented by an application program configured to run on the electronic device) includes receiving information including spatial locations of these devices in the environment and associating each IoT device with a respective three-dimensional (3D) or two-dimensional (2D) position in the environment based on the spatial information, includes receiving information including spatial locations of these devices in the environment and associating each IoT device with a respective three-dimensional (3D) or two-dimensional (2D) position in the environment based on the spatial information. The method also includes generating a digital map representing the 3D or the 2D position of the IoT devices in the environment. In some embodiments, the digital map can be overlaid on a layout of a physical floorplan of the environment. In some embodiments, the layout can be selected in a user-friendly manner from one or more pre-loaded floorplan templates corresponding to different types of floorplans. In some embodiments, new floorplan templates can be added to an existing set of floorplan templates. In some embodiments, physical objects (e.g., walls, furniture, plants, paintings, lamps, staircase, bathroom fixtures, plumbing fixtures, etc.) in the environment can be represented on the floorplan template by preloaded visual indicia that provide realistic displays of the physical objects. In some embodiments, a floorplan template can be modified by adding new indicia representing physical objects that are newly-added in the environment. In some embodiments, the indicia can be customized, if a user so desires.

In some embodiments, the IoT devices can be represented on the digital map using industry-standard icons or user-defined icons. Such a representation can allow configuration/registration of the IoT devices to various areas/locations of the house. For example, a floorplan can depict a living room and via a user interface a user can tag IoT devices such as motion sensors or remote smoke detectors in the floorplan to assign these devices to the "living room area." Similarly, a user can tag icons corresponding to an oven, a microwave, a refrigerator, and smart appliances via a user interface to assign these IoT devices in the "dining area." Thus, embodiments of the present technology provide the option of stepwise registration or assignment of IoT devices during installation.

In some embodiments, the digital map provides settings/configurations, network addresses, and operational details of the different IoT devices installed in the environment. In some embodiments, a control signal can be sent to an IoT device to query the operational settings of the IoT device. In some embodiments, the digital map provides an option to modify the settings/configurations of the IoT devices via a graphical user interface (GUI) of an electronic device that is located remotely from the IoT devices. Such modification, for example, can be implemented by communicating control signals from the electronic device to the IoT devices, wherein the control signals include updated settings/configurations. In some embodiments, updated settings/configurations can be sent to an IoT device based on a request from the user and/or based on operational settings of the IoT device. The electronic device displaying the GUI can include a transceiver to provide various commands and control signals to a transceiver included in an IoT device. These commands and control signals can be sent using various wireless communication protocols and techniques, such as Bluetooth, cellular, infrared, Wi-Fi, etc. In some embodiments, the electronic device can communicate with the same IoT device using multiple wireless communication protocols and techniques. In certain applications, the communication channel that allows remote control of an IoT device can include a wired communication channel. Thus, it will be appreciated that embodiments of the present disclosure provide the ability to monitor and control a plurality of different types of IoT devices from different manufacturers via a single GUI common to all the IoT devices in the environment, without the necessity to make use of separate manufacturer-provided means of communicating with the IoT devices. Different IoT devices in an environment can be controlled via a "central" or a "master" GUI that is easily usable/understandable by a user who desires to leverage functionalities of the different IoT devices within a commonly-implemented GUI. For example, a process associated with a central GUI can be configured to call individual software/firmware/API's associated with individual IoT devices.

In some embodiments, the GUI provides the ability to select settings that would impact a group of IoT devices in the environment. Such a group can include every single device in the environment or can be a subset of the IoT devices in the environment. Such a group can, for example, be formed by selecting individual IoT devices to be part of the group, and assigning a group name (e.g., by typing a desired group name via the GUI). Once a group is formed, various functionalities of the IoT devices within the group can be activated and/or adjusted. These functionalities can be identical to all the IoT devices in the group, or they can be different across the devices in the group. For example, group timer selection, group time settings, group network settings, can be made in a manner similar to the settings that would impact an individual IoT device. For example, a software update for a group of can be pushed out to multiple IoT devices in the group. Additionally, if desired, a single disconnect button on the GUI can sever communications with all devices within the group or groups. IoT devices forming a group are not necessarily constrained to be devices of the same type or the same manufacturer but rather can be different types of devices and/or can be from different manufacturers. Furthermore, according to embodiments disclosed herein, when a new IoT device is deployed in the environment, the GUI can be configured to initially discover (e.g., based on a registration signal received from the new IoT device) and subsequently control the new IoT device. In some embodiments, information pertaining to the new IoT device is broadcast to the one or more IoT devices deployed in the environment.

In conventional systems, IoT devices, at best report their presence based on a listing of some kind of information identifying the IoT devices. Such a listing is a static listing which makes it difficult for a user which IoT device is installed in which location (e.g., where) with respect to an environment, does not involve a GUI, and also offers limited functionality for remote management/control of IoT devices. Also, information reported by IoT devices are in different formats which are manufacturer-developed, proprietary, and not necessarily compatible with one another. Furthermore, conventional systems also have cumbersome naming conventions for IoT devices which makes it difficult for a user to identify IoT devices.

In contrast, disclosed embodiments facilitate the mapping and controlling of network-enabled IoT devices housed in an environment via a "central" graphical user interface (GUI) that communicates with various types of IoT devices and associates each IoT device with a particular location relative to the environment. Instead of identifying a door sensor with a merely generic device name, disclosed embodiments can display a visual representation of a door sensor on a map of the environment where the door sensor is located. Thus, if there are four doors in a home and each one has a sensor, a user is able to identify/locate a door sensor of a bed room distinct from a door sensor in the guest room. That is, the graphical representation of IoT devices are relative to the environment. Not only does the disclosed technology facilitate a topological display of IoT deployed in an environment, but also identifies "IoT holes" due to the absence of expected IoT devices in the environment and further offers recommendations to fill the gap arising due to the holes. These, and several other features, functionalities, and advantages of the disclosed technology will be better understood in the discussions that follow.

FIG. 1A illustrates an example floor plan 100A of a home depicting IoT devices installed in different locations in the home environment. For example, IoT devices in the living/dining area of a home 102 include a gateway, smart lighting, a thermostat, a television, a remote motion detector, and a remote smoke detector. The bedroom of the home 102 includes IoT devices 104 such as door and window sensors, a remote smoke detector, a router, a room thermostat, a television, and smart lighting. The kitchen of the home 102 includes IoT devices 104 such as a refrigerator, a washer/dryer, door and window sensors, and a remote smoke detector.

Figure 1B:
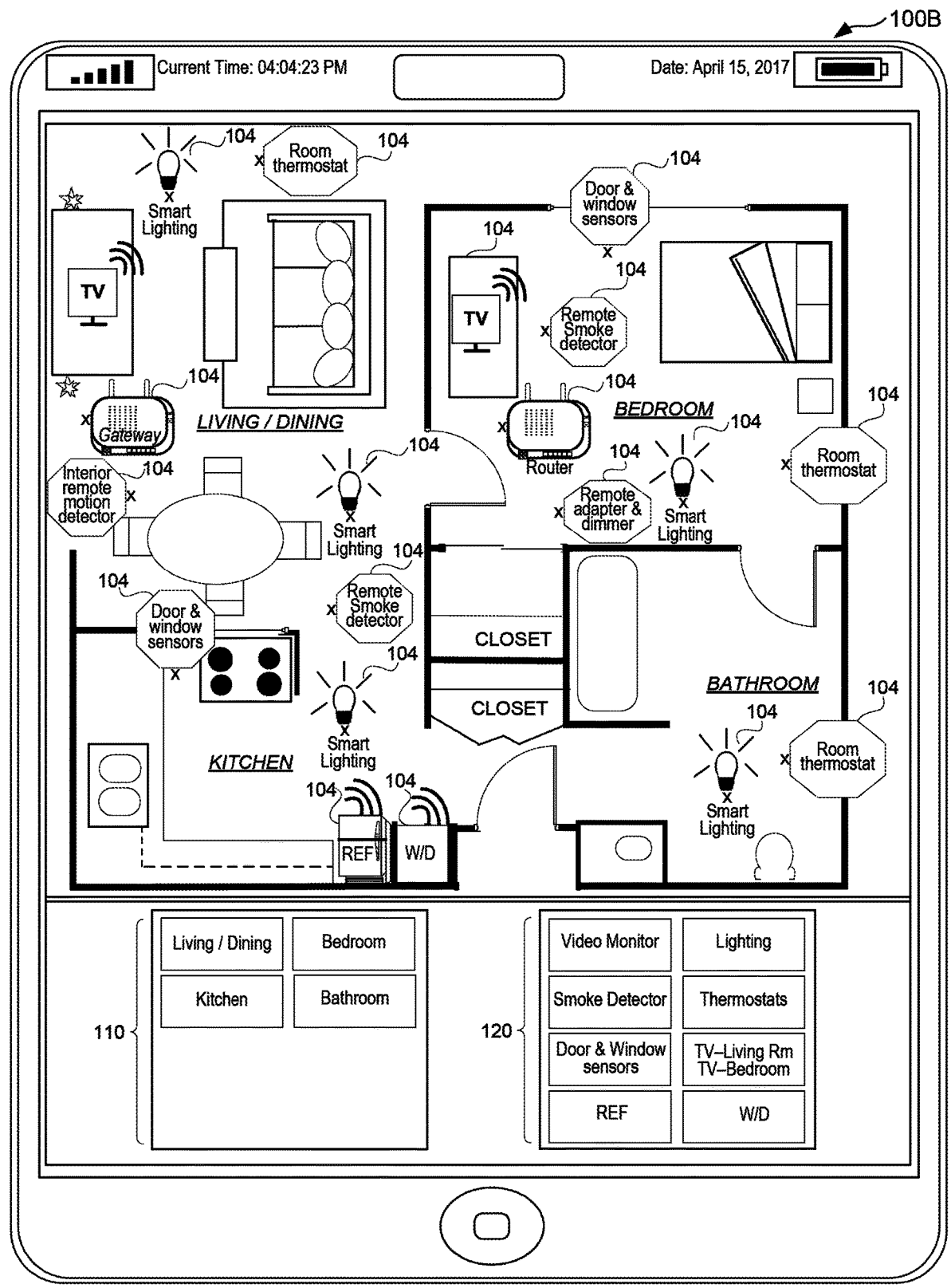
FIG. 1B illustrates a graphical user interface of a user's electronic device showing the floor plan with the IoT devices and their respective locations environment, according to some disclosed embodiments.

FIG. 1B illustrates a graphical user interface 100B of a user's computing device (e.g., a mobile phone) showing the floor plan of FIG. 1A with IoT devices and their respective locations with respect to the environment. For example, the interface displays a home environment that includes a living/dining area, a bedroom, a kitchen, and a bathroom. IoT devices are displayed installed in these areas. Region 110 of the interface displays a listing of the various areas of the home and region 120 of the interface displays the various IoT devices installed in the home. If a user clicks on the bedroom icon in region 110, the interface would display all the IoT devices in the bedroom. If a user clicks on the bathroom icon of the interface, the interface would display all the IoT devices in the bathroom. Thus, the interface can filter/display information pertaining to IoT devices by rooms or areas of the home. If a user click on thermostats icon in region 120 of the interface, the interface would display all rooms or areas of the home where thermostats are installed. Thus, the interface can also filter/display location information for all areas where an IoT device is installed, based on a selection of a type of IoT device by a user.

In some embodiments, the disclosed technology can identify a location of an IoT device based on a type of IoT device. Thus, if a refrigerator (i.e., an IoT device) registers itself with the application program rendering the interface, the application program is able to associate the refrigerator with a kitchen location in the environment. Similarly, if a garage door (i.e., an IoT device) registers itself with the application program rendering the interface, the application program is able to associate the garage door with a garage location in the environment. Disclosed embodiments provides the option of filtering IoT devices installed in an environment based on a type of device, a location or an area (e.g., a kitchen or a bedroom), a status type reflecting connectivity of an IOT device, an alert/notification associated with an IoT device, a security protocol of an IoT device, a type of manufacturer of an IoT device, or a type of communication protocol associated with an IoT device. It will be understood that a status type reflecting connectivity of an IOT device can identify whether the IoT device is an ON state, an OFF state, or a SLEEP (e.g., for power savings) stare. An alert/notification associated with an IoT device can come from the device itself or from a peer IoT device in the event that the device is exhibiting anomalous behavior, has low battery, consuming high power, undergoing intermittent failures, sending malicious data packets, flooding the communication network with redundant packets, etc. A security compliance protocol of an IoT device are one or more security protocols that the IoT device is compliant with. Such protocols can be industry standard protocols or proprietary protocols.

Figure 2:
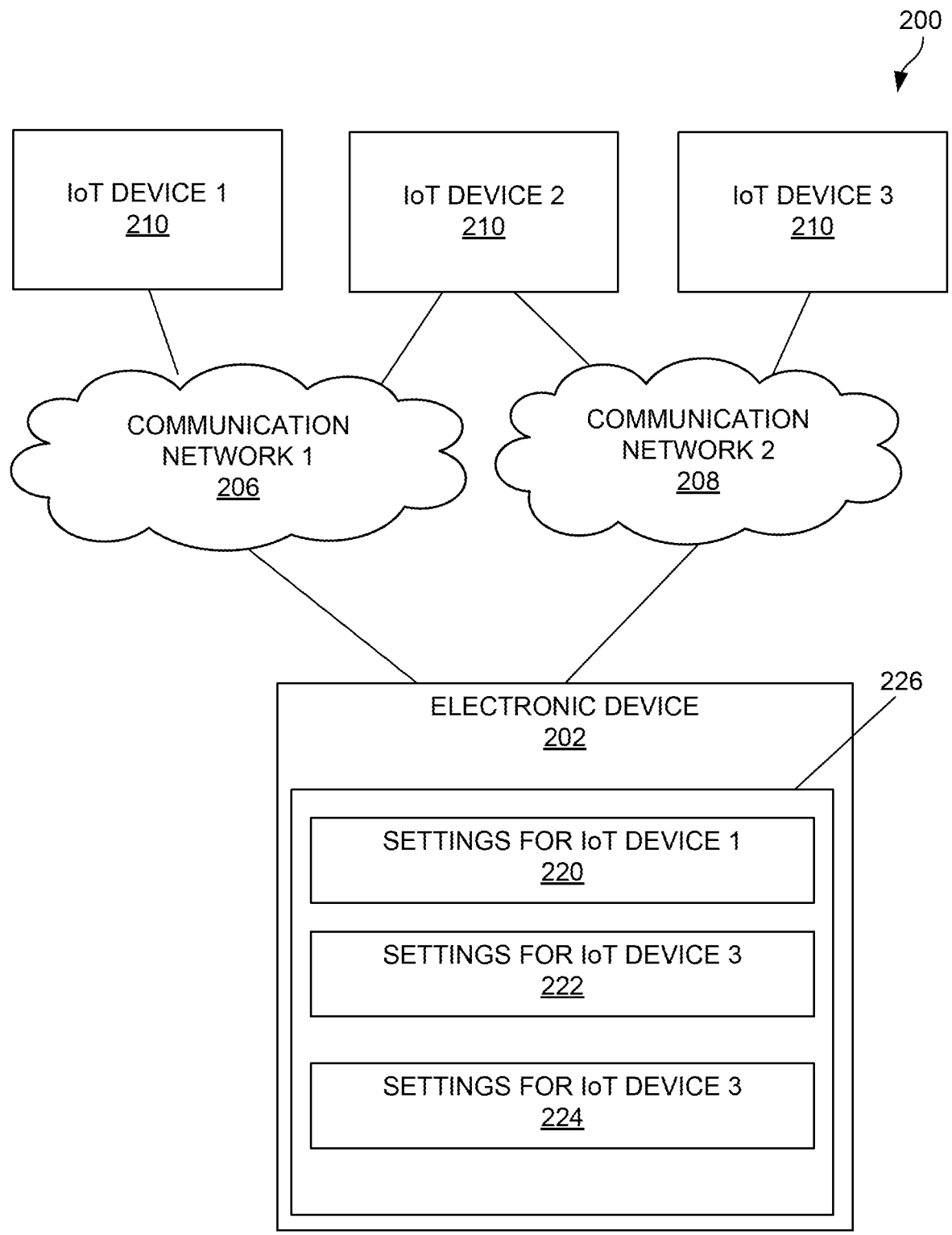
FIG. 2 illustrates an embodiment of a system for mapping and controlling network-enabled IoT devices, according to some disclosed embodiments.

FIG. 2 illustrates an embodiment of a system 200 for mapping and controlling network-enabled IoT devices housed in an environment via a graphical user interface (GUI) of an electronic device. Examples of an environment can include an office, a factory, a school, a residence, a laboratory, or otherwise any physical facility. The system 200 includes an electronic device 202 and one or more IoT devices 210 coupled to communication networks 206 and 208. Examples of an electronic device can include a set top box, a phone, a tablet computer, a router, a gateway, or an IoT controller/base station. In some embodiments, the GUI is associated with an application program (e.g., non-transitory machine-readable storage medium) configured to run on the electronic device. Thus, in some embodiments, the application program allows the electronic device to communicates with the IoT devices installed in the environment.

In some examples, the IoT devices can be of different types and/or can be produced by different manufacturers. In some embodiments, an IoT device 210 can communicate commands and control signals to electronic device 202 via more than one communication network, e.g., using multiple wireless communication protocols and techniques. The commands and control signals can be sent using various wireless communication protocols and techniques, such as Bluetooth, cellular, infrared, Wi-Fi, etc. The electronic device 202 may access a storage medium connected to the electronic device 202 using a local communication bus, such as parallel ATA (PATA, also called IDE or EIDE), Serial ATA (SATA), SCSI, Serial Attached SCSI (SAS), Fibre Channel, IEEE 1394 (also called FireWire), USB, SCSI, or Thunderbolt. For example, each of a computer, a remote control device configured to operate a DVR or a set-top box, a PDA, a mobile phone, a consumer wearable device, a head-mounted display device, or generally, any mobile communication device may serve as the electronic device 202.

In some embodiments, the electronic device 202 may access a remote server (e.g., a physical server or located in the cloud) to download information, operational settings, parameters, network settings, or specific instructions (such as software development kits or SDKs) to communicate with each of the IoT devices 210. In certain applications, the communication channel that allows remote control of an IoT device can include a wired communication channel, including, but not limited to public switched telephone networks (PSTN), local area networks (LAN), and wide area networks (WAN) providing data communication services and/or Internet access.

In the system 200, also shown is a graphical user interface 226 that display settings 220 for IoT device 1, settings 222 for IoT device 2, and settings 224 for IoT device 3. In some embodiments, graphical user interface 226 also displays a digital map representing the 3D or the 2D position of IoT device 1, IoT device 2 and IoT device 3 in the environment. In some embodiments, the digital map can be overlaid on a layout of a physical floorplan of the environment.

Figure 3:
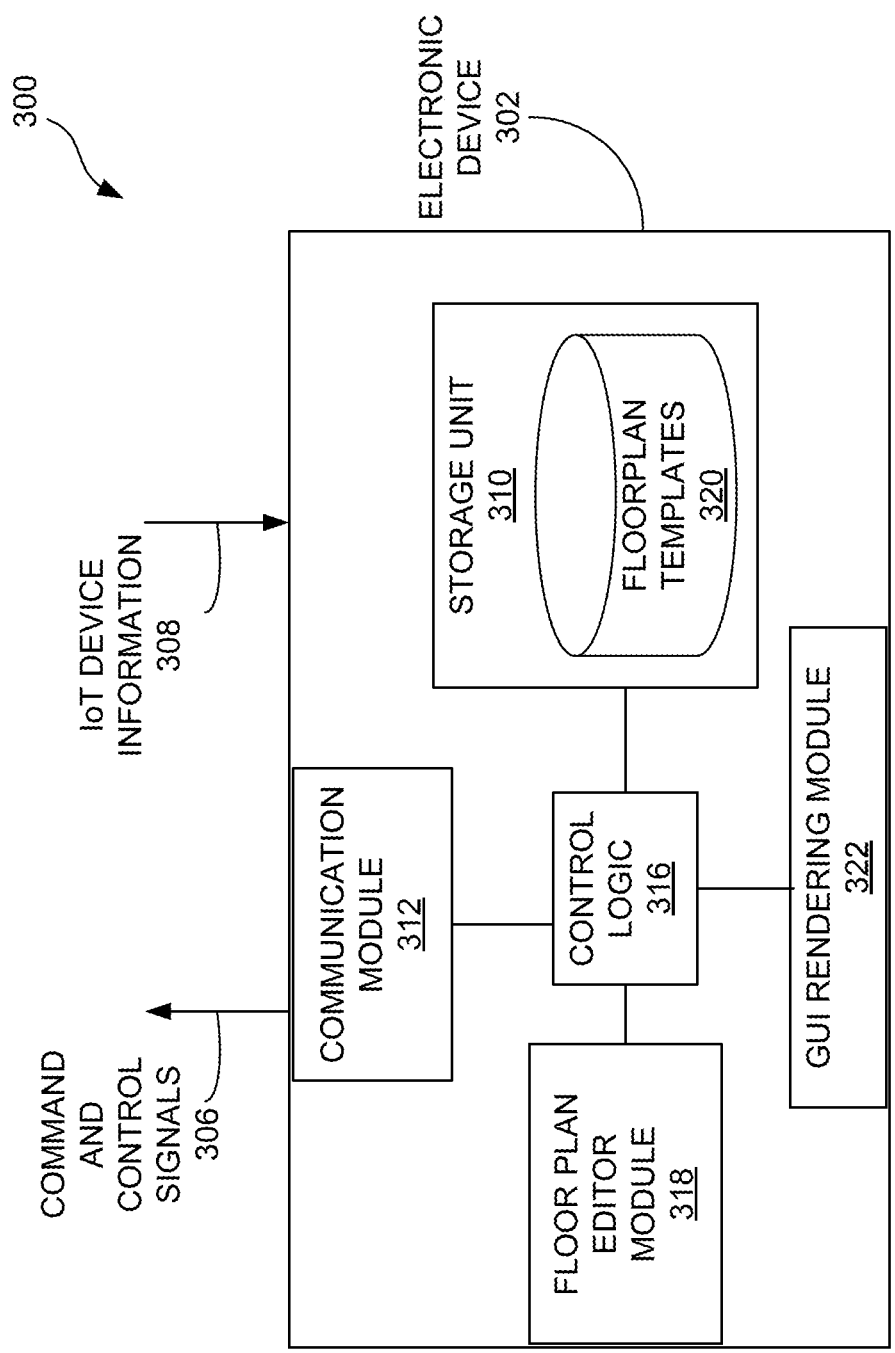
FIG. 3 illustrates an embodiment of an electronic device for displaying a digital map, according to some disclosed embodiments.

FIG. 3 illustrates an embodiment of an electronic device 302 in a system 300 for displaying a digital map that includes location information and operational settings for one or more IoT devices managed by electronic device 302. The electronic device 302 may be an example of the electronic device 202 described in reference to FIG. 2. Examples of an electronic device can include a set top box, a phone, a tablet computer, a router, a gateway, or an IoT controller/base station. The electronic device 302 includes a communication module 312, a floor plan editor module 318, control logic 316, a storage unit 310 storing floorplan templates 320, and a GUI rendering module 322.

The communication module 312 receives IoT device information 308 (e.g., spatial information and operational parameters/network settings) from one or more IoT devices via the communication network 306 and/or communication network 308. In some applications, the IoT device information 308 can be a registration signal for an IoT device that is newly-deployed in the environment. The communication module 312 also includes one or more radios (e.g., cellular, Wi-Fi, infrared, etc.) for communicating with IoT devices using one or more communication protocols or standards associated with the radios. The communication module conveys the IoT device information 308 to control logic 316 for subsequent processing.

Control logic 316 generates command and control signals 306 that are communicated to IoT devices. The command and control signals 306 can be used to manage and/or modify the operational settings of the IoT device. In some applications, the command and control signals are broadcast signals directed at changing group settings, e.g., a group of IoT devices. In some applications, the command and control signals are directed at a single IoT device, e.g., an update signal sent to an IoT device. In some embodiments, control logic 316 associates each IoT device in the environment with a respective position in the environment based on the spatial information received in the IoT device information 308. Control logic 316 conveys the outcome of processing IoT device information 308 to GUI rendering module 322.

GUI rendering module 322 creates and displays a GUI for display on a screen coupled to the electronic device 302. The GUI can include a digital map showing the physical locations of the IoT devices, based on the received IoT device information 308. The GUI can also have an option to provide information (in real time, near real time, or otherwise) pertaining to the settings and operational parameters of the IoT devices that are displayed on the digital map. In some applications, the GUI provides an option to change the settings and operational parameters of the IoT devices. For example, the digital map can display the 3D or the 2D position (e.g., based on IoT device information 308) of the IoT devices in the environment. In some embodiments, the GUI rendering module 322 is based on the iCMS control and monitor application.

In some embodiments, the digital map indicates a name of a room (e.g., a living room) that houses the IoT device in the environment. In some implementations, when a user selects an IoT device displayed on the GUI, the name and/or other information about the selected IoT device may be displayed as a label on the digital map. In some embodiments, IoT device information and/or operational settings of an IoT device is displayed as metadata on the label. In some embodiments, the digital map can be overlaid on a layout of a physical floorplan of the environment. In some embodiments, the physical floorplan can be selected from a set of floorplan templates stored in one or more storage units 310 (e.g., memory) coupled to the electronic device.

One or more storage units 310 may be included internal and/or external to the electronic device 302. The storage unit 310 may store floorplan templates (e.g., one or more templates for a living room, one or more templates for a bedroom, one or more templates for a child's nursery room, one or more templates for laboratories or research facilities, and the like), which can be selected based on a simple drag-and drop mechanism. In some embodiments, the electronic device 302 may generate floorplan templates 320 or can receive/retrieve them periodically or intermittently from a remote server.

In some embodiments, a floorplan editor module 318 included in electronic device 302 allows a floorplan template to be modified by adding additional elements or features to the floorplan or the digital map. For example, the floorplan editor module 302 allows adding new indicia representing physical objects in the environment. In some embodiments, the indicia can be customized, if a user so desires. For example, a floorplan template can be modified in a manner such that a physical floorplan can include one or more indicia representing one or more physical objects (e.g., a wall, furniture, a plant, a painting, a lamp, a staircase, a bathroom fixture, or a plumbing fixture) in the environment. These indicia can be downloaded or received from a server and saved in one or more storage units 310 for inclusion in the floorplan templates. Furthermore, the electronic device 302 and system 300 may include other components, modules, elements, or devices not illustrated for the sake of brevity.

Figure 4:
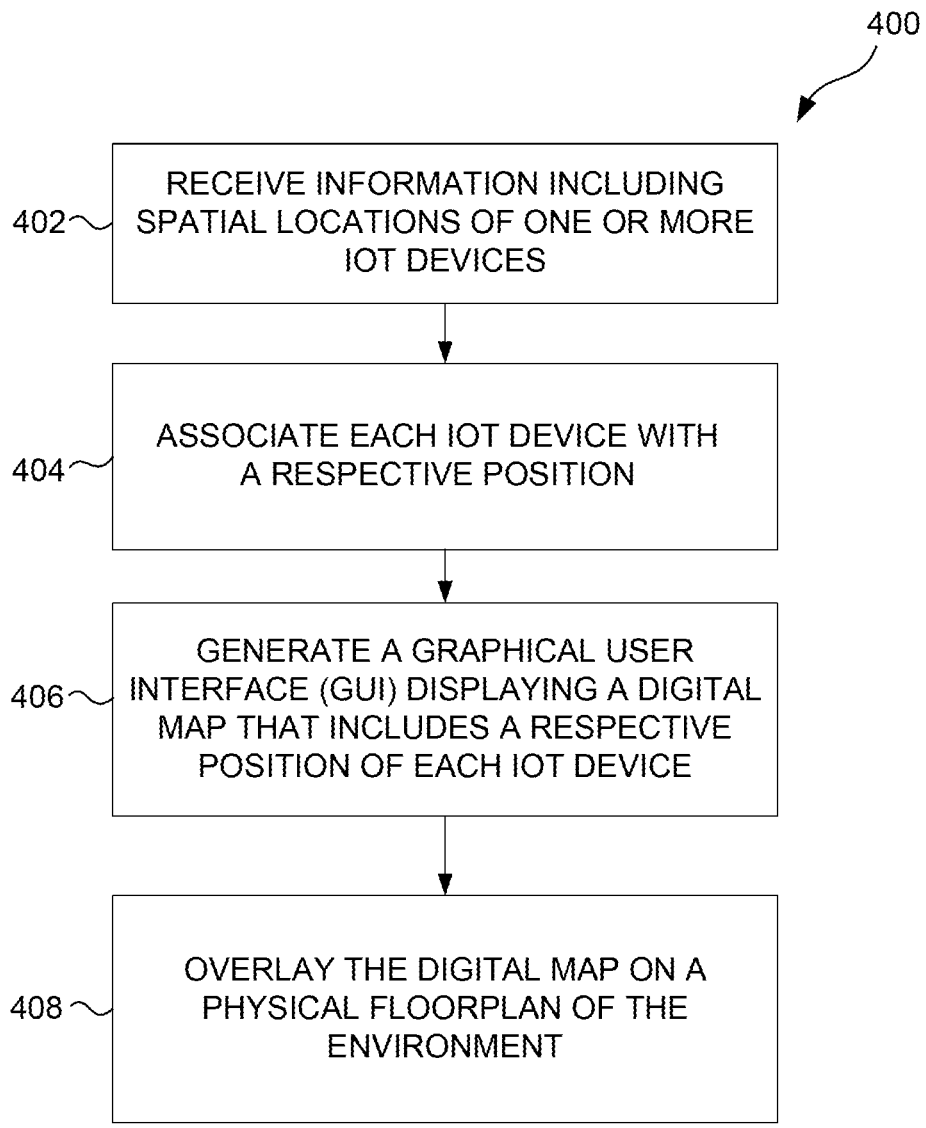
FIG. 4 is a flow diagram representing method steps for creating a digital map that indicates IoT devices deployed in an environment, according to some disclosed embodiments.

FIG. 4 is a flow diagram representing a process that includes method steps for creating a digital map that indicates IoT devices deployed in an environment, thereby allowing remote management/control of the IoT devices deployed in the environment. The steps, for example, can be implemented by an application program configured to run on an electronic device. Examples of an electronic device can include a set top box, a phone, a tablet computer, a router, a gateway, or an IoT controller/base station. Starting at step 402, the process receives information that includes spatial locations of one or more IoT devices deployed in an environment (e.g., a school, an office, a building, or otherwise any facility indoors or outdoors). For example, the received information can include metadata such as a device name, a MAC address, an operational status of the device, an IP address of the device, and/or other configurational parameters of an Iot device. In some embodiments, the process can receive information about a first IoT device installed in an environment from a second IoT device installed in the environment. Based on the information received from the second IoT device, the process can predict what is the first IoT device, an accurate or an approximate spatial location where the first IoT device is installed, and other parameters/information relating to the first IoT device. Thus, embodiments of the present disclosure allow for both self-discovery of IoT devices or peer-based discovery of IoT devices installed in an environment. At step 404, the process associates each IoT device with a respective position in the environment based on the spatial information. The position can be based on a global co-ordinate system (e.g., based on latitude/longitude information). In some embodiments, the position can be with respect to a landmark, a room or a floor, a distance to a wall, or generally based on a reference point within the environment. The spatial location of an IoT device can be determined by a location-based sensor (e.g., an on-board GPS receiver) within the IoT device and then sent by the IoT device to the electronic device. In some embodiments, the spatial information can be determined based on an electronic signal (e.g., triangulation mechanism using Wi-Fi, Bluetooth, or cellular signals) sent by the IoT device. In some applications, a second IoT device in the environment can relay or convey the spatial information of a first IoT device to the electronic device. Such a situation, for example, when the first IoT device is located in a "dead zone" characterized by weak radio signals or, when the first IoT device lacks the capability to determine its own spatial information. In some embodiments, the process uses the spatial information to provide a corrective recommendation. Based on the spatial information of a first IoT device and a second IoT device, the process can determine the distance between two IoT devices. If the distance between two IoT devices is more (or, less) than a threshold, then the process can provide a corrective recommendation to bring the first IoT device and second IoT close to one another. For example, if the process determines that an IoT camera is too far from an IoT router, then the process can indicate via an audio-visual alert on the map, to bring the IoT camera and the IoT camera close to one another.

At step 406, the process generates a graphical user interface (GUI) displaying a digital map that includes a respective position of each IoT device in the environment. Such a digital map can be rendered on a screen or a monitor coupled to the electronic device. For example, the GUI can display a digital map automatically populated with a graphical representation of the one or more IoT devices that are deployed, such that the graphical representation corresponds to the spatial information of the one or more IoT devices. At step 408, the process overlays the digital map on a physical floorplan of the environment. In some applications, a physical floorplan can include one or more indicia representing one or more physical objects (e.g., walls, furniture, plants, paintings, lamps, staircase, bathroom fixtures, plumbing fixtures, etc.) included in the environment.

In some embodiments, the disclosed technology can identify missing IoT devices in the environment based on spotting IoT "holes" in a digital map. Thus, if there is a remote camera (i.e., an IoT device) on one side of a house and no cameras on the other side(s) of the house, the program that displays the GUI can detect an absence of a camera on the other side(s) of the house, based on identifying a "hole" on a digital map and notify a user that a hole is identified. Thus, for certain locations in an environment, the disclosed technology can detect the absence of expected IoT devices that are typically meant to be positioned in those locations. Based on detecting a type of a location (e.g., a living room, a bed room, a kitchen, a garage, a basement, a class room, an office, or any other location), the system can recommend one or more IoT devices that can be deployed or installed in a particular type of location. In some embodiments, the program can recommend one or more IoT devices that can be installed in such locations to fill up the voids created by the "IoT holes." For example, the system can recommend a list of standard IoT devices depending on various locations in an environment. Thus, there can be a first list of IoT devices for the interior(s) of an environment and a second set of IoT devices for the exterior(s) of an environment. In some embodiments, one or more IoT devices can be commonly included in multiple lists for different locations in an environment. In some implementations, the disclosed technology offers recommendations for IoT devices based on IoT devices that already exist at a particular location or in nearby locations. Thus, for example, based on the IoT devices detected in a bedroom, the system can recommend IoT devices that can be installed or deployed in the kitchen and/or the living room. In some implementations, the recommendations for the IoT devices solely depend on a particular type of location in an environment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A non-transitory machine-readable storage medium having stored thereon instructions which, when executed by a processor of an electronic device, cause the processor to:
   receive information including first spatial locations of one or more IoT devices deployed in an environment;
   associate each IoT device in the one or more IoT devices with a respective position in the environment based on the spatial information;
   generate a graphical user interface (GUI) for displaying a digital map that includes a graphical representation of the one or more IoT devices relative to the environment, wherein the graphical representation corresponds to the spatial information;
   upon receiving a request from a user of the electronic device, overlay the digital map on a physical floorplan of the environment, wherein the physical floorplan is selected from a set of floorplan templates and includes one or more indicia representing one or more physical objects included in the environment;
   identify, based on at least one device type and at least one location type of the one or more IoT devices installed in the first spatial locations, a lack of presence of at least one IoT device in a second spatial location of the environment; and
   recommend the at least one IoT device for installation in the second spatial location of the environment.

2. The non-transitory machine-readable storage medium of claim 1, wherein the information including first spatial locations of one or more IoT devices includes settings, configurations, network addresses, and operational details of the one or more IoT devices in the environment.

3. The non-transitory machine-readable storage medium of claim 1, wherein the second spatial location of the environment is an expected location for installation of the at least one IoT device.

4. The non-transitory machine-readable storage medium of claim 1, wherein the request from the user of the electronic device is a first request, wherein the instructions further cause the processor to:
   upon receiving a second request from the user, update the set of floorplan templates by adding a new floorplan template to the set of floorplan templates.

5. The non-transitory machine-readable storage medium of claim 1, wherein the request from the user of the electronic device is a first request, wherein the instructions further cause the processor to:

upon receiving a second request from the user, modify the physical floorplan of the environment by modifying the one or more indicia representing the one or more physical objects included in the environment.

6. The non-transitory machine-readable storage medium of claim 1, wherein the respective position is a three-dimensional (3D) or a two-dimensional (2D) position in the environment based on the spatial information.

7. The non-transitory machine-readable storage medium of claim 1, wherein the one or more physical objects included in the environment comprises at least one of: a wall, furniture, a plant, a painting, a lamp, a staircase, a bathroom fixture, or a plumbing fixture.

8. The non-transitory machine-readable storage medium of claim 1, wherein the respective position of each IoT device is represented on the digital map by an industry-standard icon or a user-defined icon.

9. The non-transitory machine-readable storage medium of claim 1, wherein the request from the user of the electronic device is a first request, wherein the instructions further cause the processor to:
   upon receiving a second request from the user, communicating a control signal to the one or more IoT devices for querying operational settings of the one or more IoT devices; and
   based on operational settings of the one or more IoT devices and a third request from the user, communicating an update signal to modify the operational settings of the one or more IoT devices.

10. The non-transitory machine-readable storage medium of claim 1, wherein the one or more IoT devices are of different types or produced by different manufacturers, and wherein the GUI is configured to control each of the one or more IoT devices through a common interface.

11. The non-transitory machine-readable storage medium of claim 1, wherein the instructions further cause the processor to:
   upon selection of a group of IoT devices in the one or more IoT devices deployed in the environment, transmit command signals to conduct operations on all IoT devices in the group.

12. The non-transitory machine-readable storage medium of claim 11, wherein the operations includes at least one of: group timer selection, group time settings, or group network settings.

13. The non-transitory machine-readable storage medium of claim 1, wherein the instructions further cause the processor to:
   upon deployment of a new IoT device in the environment, receiving a registration signal from the new IoT device; and
   broadcast information relating to the new IoT device to the one or more IoT devices in the environment, based on the registration signal from the new IoT device.

14. The non-transitory machine-readable storage medium of claim 1, wherein the electronic device is a remote control device configured to operate a DVR or a set-top box.

15. An electronic device comprising:
   a memory;
   a processor coupled to the memory, wherein the processor is configured to:
      receive information including first spatial locations of one or more IoT devices deployed in an environment;
      associate each IoT device in the one or more IoT devices with a respective position in the environment based on the spatial information;
      generate a graphical user interface (GUI) for displaying a digital map that includes a graphical representation of the one or more IoT devices relative to the environment, wherein the graphical representation corresponds to the spatial information;
      upon receiving a request from a user of the electronic device, overlay the digital map on a physical floorplan of the environment, wherein the physical floorplan is selected form a set of floorplan templates and includes one or more indicia representing one or more physical objects included in the environment;
      identify, based on at least one device type and at least one location type of the one or more IoT devices installed in the first spatial locations, a lack of presence of at least one IoT device in a second spatial location of the environment; and
      recommend the at least one IoT device for installation in the second spatial location of the environment.

16. The electronic device of claim 15, wherein the one or more IoT devices are of different types or produced by different manufacturers, and wherein the GUI is configured to control each of the one or more IoT devices through a common interface.

17. A computer-implemented method comprising:
   receiving information including first spatial locations of one or more IoT devices deployed in an environment;
   associating each IoT device in the one or more IoT devices with a respective position in the environment based on the spatial information;
   generating a graphical user interface (GUI) for displaying a digital map that includes a graphical representation of the one or more IoT devices relative to the environment, wherein the graphical representation corresponds to the spatial information;
   upon receiving a request from a user of the electronic device, overlaying the digital map on a physical floorplan of the environment, wherein the physical floorplan is selected from a set of floorplan templates and includes one or more indicia representing one or more physical objects included in the environment;
   identifying, based on at least one device type and at least one location type of the one or more IoT devices installed in the first spatial locations, a lack of presence of at least one IoT device in a second spatial location of the environment; and
   recommending the at least one IoT device for installation in the second spatial location of the environment.

18. The computer-implemented method of claim 17, wherein the request from the user of the electronic device is a first request, wherein the instructions further cause the processor to:
   upon receiving a second request from the user, communicating a control signal to the one or more IoT devices for querying operational settings of the one or more IoT devices; and
   based on operational settings of the one or more IoT devices and a third request from the user, communicating an update signal to modify the operational settings of the one or more IoT devices.

19. The computer-implemented method of claim 17, wherein the one or more IoT devices are of different types or produced by different manufacturers, and wherein the GUI is configured to control each of the one or more IoT devices through a common interface.

20. The computer-implemented method of claim 17, further comprising:

upon selection of a group of IoT devices in the one or more IoT devices deployed in the environment, transmit command signals to conduct operations on all IoT devices in the group.

\* \* \* \* \*